US007210107B2

(12) United States Patent
Wecker et al.

(10) Patent No.: US 7,210,107 B2
(45) Date of Patent: Apr. 24, 2007

(54) MENUS WHOSE GEOMETRY IS BOUNDED BY TWO RADII AND AN ARC

(75) Inventors: David B. Wecker, Redmond, WA (US); Cameron A. Etezadi, Bellevue, WA (US); Timothy Sharpe, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 892 days.

(21) Appl. No.: 10/607,797

(22) Filed: Jun. 27, 2003

(65) Prior Publication Data

US 2004/0263475 A1 Dec. 30, 2004

(51) Int. Cl.
G06F 3/00 (2006.01)

(52) U.S. Cl. ...................... 715/863; 715/834
(58) Field of Classification Search .............. 715/834, 715/863
See application file for complete search history.

(56) References Cited

U.S. PATENT DOCUMENTS 5,701,424 A * 12/1997 Atkinson .................... 715/808
5,798,752 A * 8/1998 Buxton et al. ............... 715/863
5,798,760 A * 8/1998 Vayda et al. ................. 715/834
6,369,837 B1 * 4/2002 Schirmer ..................... 715/764
6,549,219 B2 * 4/2003 Selker ......................... 715/834

* cited by examiner

Primary Examiner—Kristine Kincaid
Assistant Examiner—Lê Nguyen
(74) Attorney, Agent, or Firm—Christensen O'Connor Johnson Kindness PLLC

(57) ABSTRACT

Sector menus track a pointer's position as a pointing device is moved. Each sector menu is a geometric figure bounded by two radii and an included arc of a circle. Menu items are housed in segments formed from multiple radii cutting the sector menu. Users select menu items housed in segments by making a direction change from a trajectory course to pass over a desired menu item so as to invoke its operation. The sector menu lacks a segment, defining a devoid segment, which is oriented in a direction toward which the pointer is moving. Segments with different sizes are available to represent the likelihood that a user would choose a given operation in a corresponding menu item housed by a corresponding segment.

10 Claims, 12 Drawing Sheets

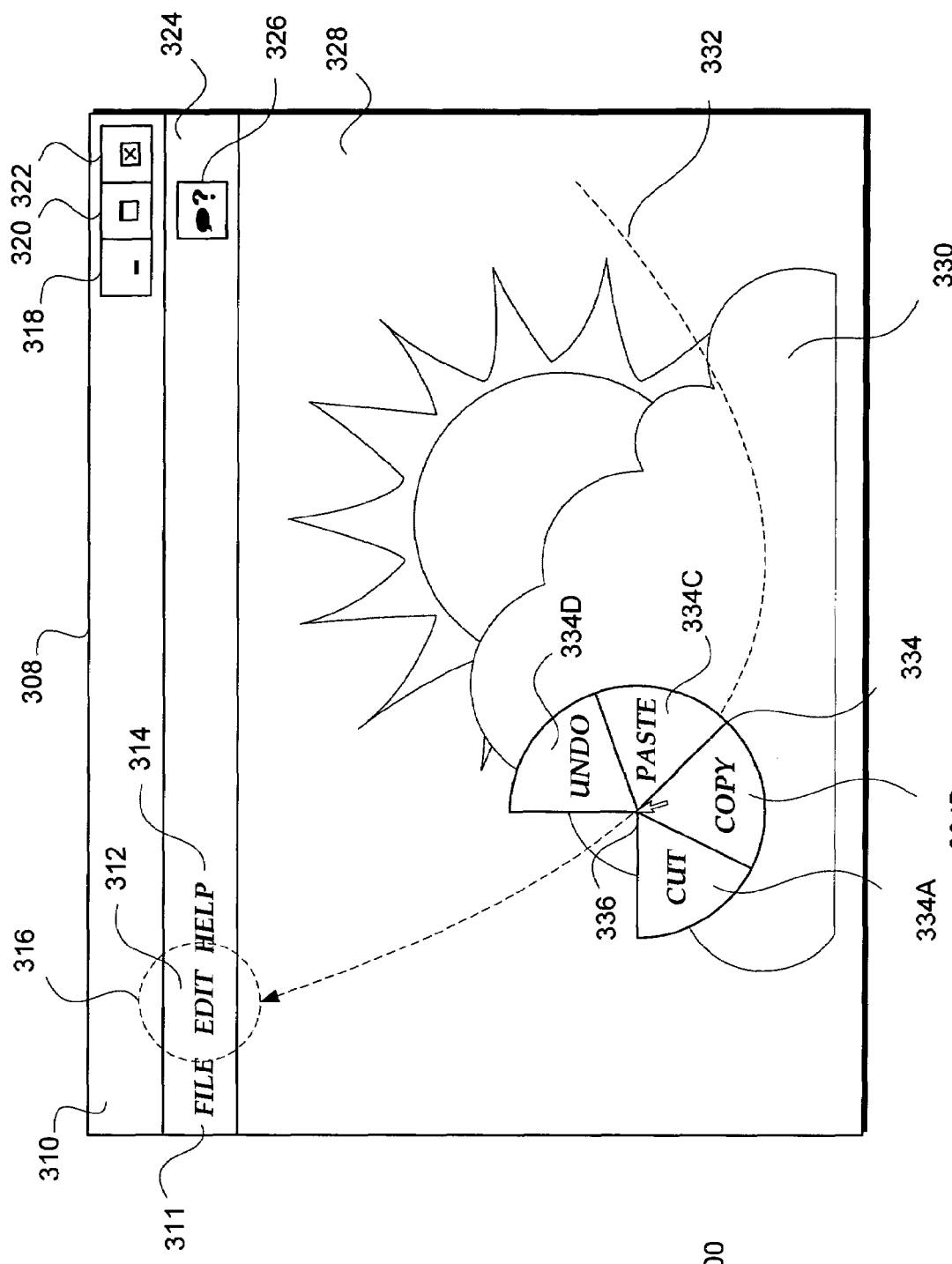
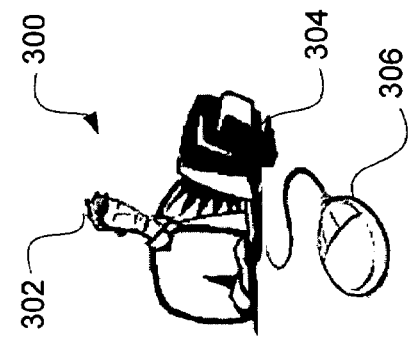
*Fig.3B.*
*Fig.3A.*

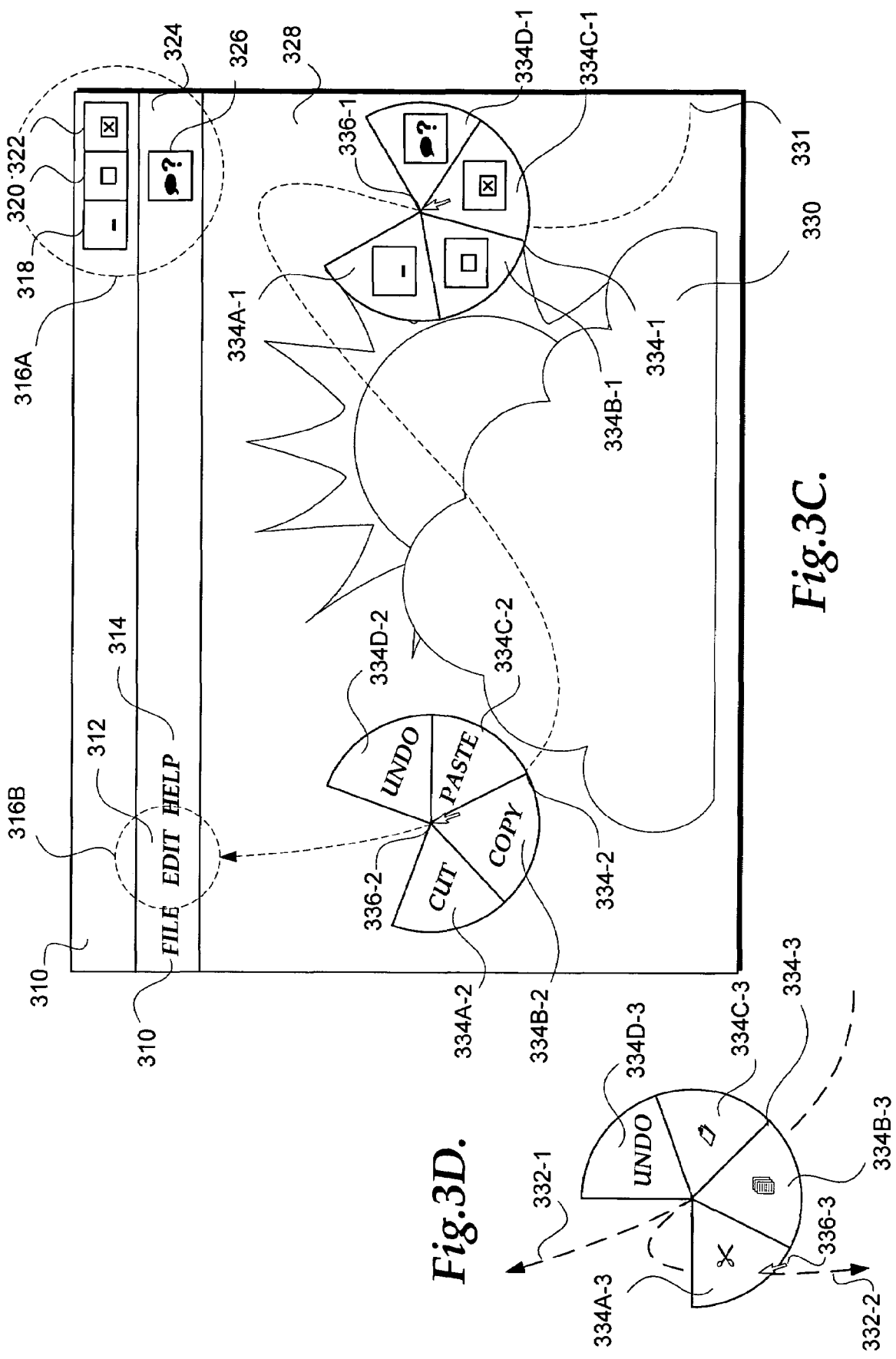

MENUS WHOSE GEOMETRY IS BOUNDED BY TWO RADII AND AN ARC

FIELD OF THE INVENTION

The present invention relates generally to human-machine interfaces, and more particularly, to the presentation of a menu having a geometric figure bounded by two radii and an included arc of a circle during navigation of a pointer in a user interface.

BACKGROUND OF THE INVENTION

A graphical user interface is a visual computer environment that represents programs, files, and options with graphical images, such as icons, menus, and dialog boxes, on a computer screen. A user can select and activate these options by pointing and clicking with a mouse (such as a mouse 104) or often, with a keyboard. A particular item (such as a scroll bar) works the same way for the user in all applications because the graphical user interface provides standard software routines to handle these elements and report the user's actions (such as a mouse click on a particular icon or at a particular location in text, or a key press).

Menus are often used with a graphical user interface. A menu is a list of options from which a user can make a selection in order to perform a desired action, such as choosing a command or applying a particular format to part of a document. A choice on a menu is called a menu item, and is selectable by either the keyboard or a mouse. In some instances, a menu item that is not available (or that is not appropriate) for a given situation is "grayed" (dimmed in comparison to valid menu choices). Many application programs, especially those that operate in a graphical user interface environment, use menus as a means of providing the user with an easily learned, easy-to-use alternative to memorizing program commands and their appropriate usage.

Many different types of menus exist. A drop-down menu is a menu that drops from a menu bar, such as a menu bar 108, when requested and remains open without further action until a user closes it or chooses a menu item. A pull-down menu is a menu that is pulled down from the menu bar and that remains available as long as the user holds it open. A pop-up menu is a menu that appears on-screen when a user makes a certain selection with the mouse. Pop-up menus can appear anywhere on the screen and generally disappear when the user selects a menu item in the pop-up menu.

A species of the pop-up menu is a context menu. Context menus like other menus, hold commands grouped by a common theme. The usual theme of a context menu is to give the user access to a set of common operations (that a programmer thinks are frequently used by users). Context menus provide, upon user input, the set of common operations that may occur for a given computer screen location and application state (and typically "pop up" in response to a right-click of a mouse).

Usability studies have suggested that novice users often have difficulty locating context menus, undermining the potential usefulness of context menus to help these users gain confidence and trust in operating a complex computing environment. Novice users are often afraid of clicking on user interface elements they do not fully understand. Furthermore, present context menus require users to right-click nowhere in particular on the computer screen to cause context menus to appear which feels incongruous to novice users.

Even if a user figures out how to bring forth a context menu, its contents (namely, the menu items) never change and do not necessary represent the user desires. Menu items of a context menu are determined by the location at which a pointer is positioned in a graphical user interface. For example, menu items associated with a context menu that is invoked from a desktop (which is an on-screen work area that uses icons and menus to simulate the top of a desk in a graphical user interface) are different from menu items associated with a context menu invoked from a word processing application. These menu items are static. The educated guesses of a programmer who constructed the context menus may be useful for many users but are not suitable for users who have developed their own preferences over time as they have become proficient in operating a complex computing environment. This problem is illustrated in further detail by a system 100 shown in FIG. 1A and an application 106 shown in FIG. 1B.

The system 100 includes a personal computer 102, which is a computer designed for use by one person at a time. Personal computers do not need to share the processing, disk, and printer resources of another computer. IBM PC-compatible computers and Apple Macintoshes are both examples of personal computers. If the personal computer 102 employs a graphical user interface, the mouse 104 coupled to the personal computer 102 can be used to navigate a pointer in applications running on such a graphical user interface.

One application example is an application 106, which is a program designed to assist in the performance of a specific computing task, such as word processing, accounting, or inventory management. See FIG. 1B. As is typical with most applications, the application 106 includes a menu bar 108, which is a rectangular bar displayed in the on-screen window of the application 106, often at the top, from which menus can be selected by a user. Names of available menus, such as a "FILE" menu 110, an "EDIT" menu 112, and a "HELP" menu 114, are displayed in the menu bar; choosing one with a keyboard or with the mouse 104 causes the list of options in that menu to be displayed.

The application 106 includes a work area 116 which has a rectangular shape. Various user interface elements may appear in the work area 116, such as a context menu 117. A number of menu items, such as a "CUT" menu item 118, a "COPY" menu item 120, a "PASTE" menu item 122, and a "FORMAT" menu item 124, appear when the user actuates the mouse 104 to right-click at a certain location indicated by a pointer 128. The pointer 128 appears as an on-screen symbol, such as an arrowhead leaning slightly leftward or rightward, that can be controlled by the mouse 104 or other input devices and is used as a means of indicating (and selecting) locations or choices on the computer screen, such as menu items 118–124 of the context menu 117.

Menu items 118–122 (cut, copy, and paste) are operations in a procedure in which the personal computer 102 acts as an electronic combination of scissors and glue for reorganizing a piece of content (such as a document) or for compiling the document from different sources. The CUT menu item 118 has an on-screen symbol resembling a pair of scissors which is located to the left of the text "CUT." The CUT menu item 118 allows the user to remove part of the document, usually placing it temporarily in memory so that the cut portion can be inserted (pasted) elsewhere. The COPY menu item 120 has an on-screen symbol resembling a set of document copies which is located to the left of the text "COPY." The COPY menu item 120 allows information to be duplicated and reproduced in another part of the document, in a different file or memory location, or in a different medium. The copy operation being invoked by the COPY menu item 120 can affect the data ranging from a single character to large segments of text and graphics images. Text and graphics, for example, can be copied to another part of the document, to the computer's memory (by means of a temporary storage facility such as a clipboard), or to a different file. In most cases, the copy operation leaves the original information in place. An on-screen symbol resembling a clipboard is located to the left of the text "PASTE" of the PASTE menu item 122. The paste menu item 122 allows the insertion of text or a graphic that has been cut or copied from one document in a different location in the same or a different document. There is no on-screen symbol associated with the FORMAT menu item 124. The FORMAT menu item 124 allows a change in the appearance of a selected piece of content, such as text, graphics, or even a cell in a spreadsheet.

It is difficult for a novice user to discover the context menu 117 (especially if the user has a mouse with only one button) and thereby conveniently access menu items 118–124 without completely exploring multiple menus, such as menus 110–114 of the application 106. Moreover, the menu items 118–124 are static and will not respond to the changing preferences of a user. Uniformity in context menus helps increase standardization of the personal computer 102 and enables all users to share similar computing experiences in regard to invoking and using context menus. Without a solution that refocuses on the personal computing experience by helping each user discover context menus that are sensitive to the user's own preferences, users may eventually no longer trust the system 100 to provide a desired, personal computing experience, causing demand for the system 100 to diminish from the marketplace. Thus, there is a need for a method and a system for providing enhanced context menus while avoiding or reducing the foregoing and other problems associated with existing context menus.

SUMMARY OF THE INVENTION

In accordance with this invention, a system, method, and computer-readable medium for presenting a sector menu is provided. The term "sector menu" means a menu having a geometric figure bounded by two radii and an included arc of a circle. (In other words, a circular geometric figure with a segment removed, phrasing negatively, or a circular geometric figure with a devoid segment, phrasing positively.) The term "educing" refers to an act of bringing out the intentions of a user, which is latent in his usage of a pointing device. The term "empathetic" means the ability of the human-machine interface to understand, be aware of, and be sensitive so as to educe the intentions of the user based on either past or present input device usage experience without having the intentions fully communicated in an objectively explicit manner (e.g., mere movement of the mouse will suffice).

The system form of the invention includes a computer system for providing context-sensitive menus. The computer system comprises an on-screen cursor that moves with the movements of a pointing device and a sector menu surrounding the on-screen cursor. The sector menu is a geometric figure bounded by two radii and an included arc of a circle.

In accordance with another aspect of the present invention, another system form of the invention includes a computer system for providing context-sensitive menus. The computer system comprises an on-screen cursor that moves with the movements of a pointing device and a sector menu appearing within a proximity of the on-screen cursor. The sector menu has multiple segments formed from multiple radii cutting the sector menu. Each segment houses a menu item for the sector menu.

In accordance with another aspect of the present invention, another system form of the invention includes a computer system for providing context-sensitive menus. The computer system comprises an on-screen cursor being moved toward a target by a pointing device and a sector menu moving with the on-screen cursor. The sector menu has multiple menu items. Each menu item represents operations of user interface elements located at the target.

In accordance with another aspect of the present invention, a method form of the invention includes a method implemented in a computer system for presenting context-sensitive menus as a user navigates a pointer. The method comprises gathering data regarding a windowing environment in which the pointer navigates. The method also comprises educing user interface elements at a target to which the pointer navigates. The method further comprises displaying a sector menu that moves with the pointer. The act of displaying includes displaying multiple segments formed by multiple radii cutting the sector menu, a segment housing a menu item which includes a user interface element at the target toward which the pointer navigates.

In accordance with another aspect of the present invention, a computer-readable medium form of the invention includes a computer-readable medium having computer-executable instructions that implements a method for presenting context-sensitive menus as a user navigates a pointer. The method comprises gathering data regarding a windowing environment in which the pointer navigates. The method also comprises educing user interface elements at a target to which the pointer navigates. The method further comprises displaying a sector menu that moves with the pointer. The act of displaying includes displaying multiple segments formed by multiple radii cutting the sector menu, a segment housing a menu item which includes a user interface element at the target toward which the pointer navigates.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIG. 3A is a pictorial diagram illustrating an exemplary user using an exemplary personal computer with an exemplary mouse.

FIG. 3B is a pictorial diagram illustrating the movement of a sector menu with a pointer in a user interface, according to one embodiment of the present invention.

FIG. 3C is a pictorial diagram illustrating a sector menu moving with a pointer at two different times during navigation along a trajectory course in a user interface, according to one embodiment of the present invention.

FIG. 3D is a pictorial diagram of a sector menu, and more particularly, a selection of a menu item in a sector menu, according to one embodiment of the present invention.

DETAILED DESCRIPTION OF THE PREFERRED EMBODIMENT

Figure 1B:
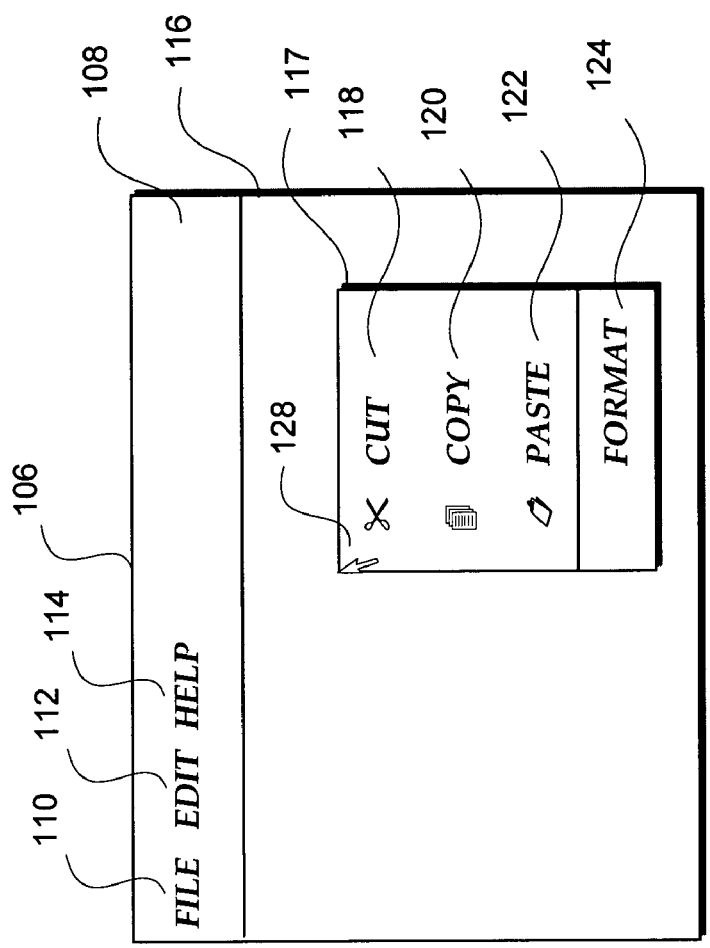
FIG. 1B is a block diagram illustrating a conventional application showing a context menu.
Figure 1A:
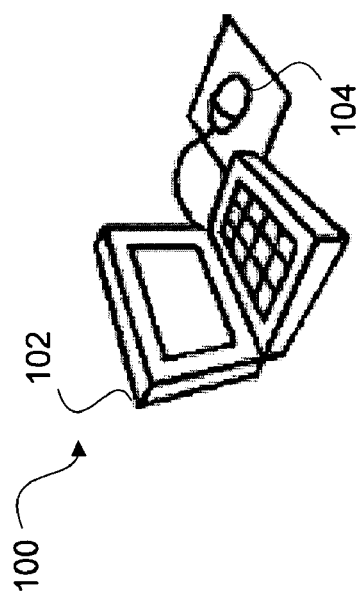
FIG. 1A is a pictorial diagram illustrating a conventional system.
Figure 2:
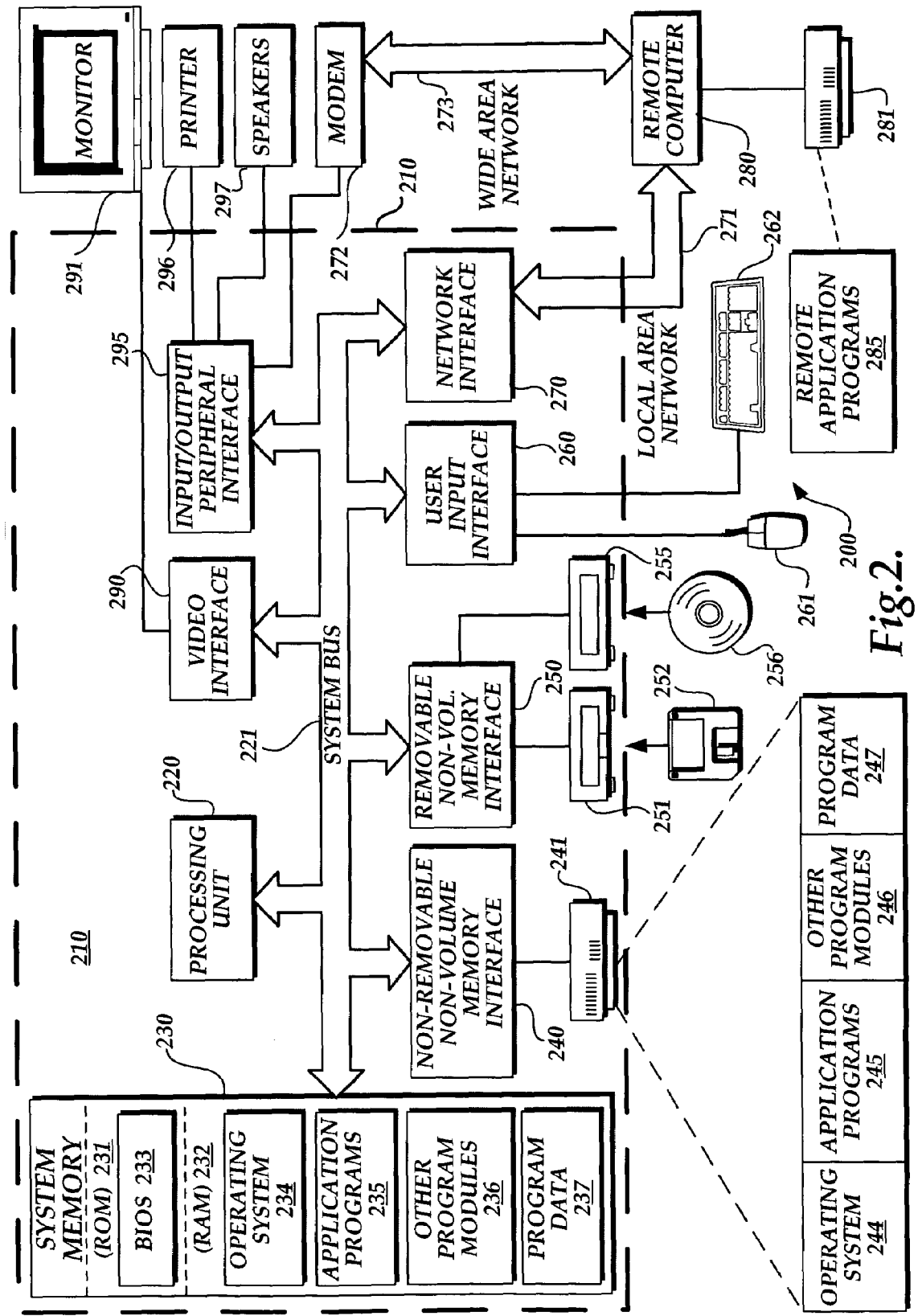
FIG. 2 is a block diagram illustrating an exemplary computing device.

FIG. 2 illustrates an example of a computing system environment 200 suitable for practicing certain aspects of the invention, such as presenting of a sector menu whose menu items are educed from a user's intentions as he navigates an on-screen cursor, such as a pointer. The computing system environment 200 is only one example of a suitable computing environment and is not intended to suggest any limitation to the scope or use of functionality of the invention. Neither should the computing environment 200 be interpreted as having any dependency or requirement relating to any one or a combination of the illustrated described components.

The invention is operational with numerous other general purpose or special purpose computing system environments or configurations. Examples of well-known computing systems, environments and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention is described in the general context of computer-executable instructions, such as program modules being executed by a computer. Generally, program modules include routines, programs, objects, components, data structures, etc. that perform particular tasks or implement particular abstract data types.

The invention may also be practiced in distributed computing environments where tasks are performed by remote processing devices that are linked through a communications network. In a distributed computing environment, program modules may be located in both local and remote computer storage media, including memory storage devices.

The computing system environment illustrated in FIG. 2 includes a general purpose computing device in the form of a computer 210. Components of computer 210 may include, but are not limited to, a processing unit 220, a system memory 230, and a system bus 221 that couples various system components including the system memory to the processing unit 220. The system bus 221 may be any of several types of bus structures, including a memory bus or memory controller, a peripheral bus, and a local bus using any of a variety of bus architectures. By way of example, and not limitation, such bus architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, also known as Mezzanine bus.

Computer 210 typically includes a variety of computer-readable media. Computer-readable media can be any available media that can be accessed by computer 210 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information, such as computer-readable instructions, data structures, program modules, or other data. Computer storage media include, but are not limited to, RAM, ROM, EEPROM, flash memory or other memory technology, CD-ROM, digital versatile disks (DVD) or other optical disk storage, magnetic cassettes, magnetic tapes, magnetic disk storage or other magnetic storage devices, or any other computer storage media. Communication media typically embody computer-readable instructions, data structures, program modules or other data in a modulated data signal, such as a carrier wave or other transport mechanism that includes any information delivery media. The term "modulated data signal" means a signal that has one or more of its characteristics set or changed in such a manner as to encode information in the signal. By way of example, and. not limitation, communication media include wired media, such as a wired network or direct-wired connection, and wireless media, such as acoustic, RF infrared, and other wireless media. A combination of any of the above should also be included within the scope of computer-readable media.

The system memory 230 includes computer storage media in the form of volatile and/or nonvolatile memory, such as read only memory (ROM) 231 and random access memory (RAM) 232. A basic input/output system 233 (BIOS), containing the basic routines that help to transfer information between elements within computer 210, such as during start-up, is typically stored in ROM 231. RAM 232 typically contains data and/or program modules that are immediately accessible and/or presently being operated on by processing unit 220. By way of example, and not limitation, FIG. 2 illustrates operating system 234, application programs 235, other program modules 236, and program data 237.

The computer 210 may also include other removable/non-removable, volatile/nonvolatile computer storage media. By way of example only, FIG. 2 illustrates the hard disk drive 241 that reads from or writes to non-removable, nonvolatile magnetic media, the magnetic disk drive 251 that reads from or writes to a removable, nonvolatile magnetic disk 252, and an optical disk drive 255 that reads from or writes to a removable, nonvolatile optical disk 256, such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital videotapes, solid state RAM, solid state ROM, and the like. The hard disk drive 241 is typically connected to the system bus 221 through a non-removable memory interface, such as interface 240, and the magnetic disk drive 251 and optical disk drive 255 are typically connected to the system bus 221 by a removable memory interface, such as interface 250.

The drives and their associated computer storage media discussed above and illustrated in FIG. 2 provide storage of computer-readable instructions, data structures, program modules and other data for the computer 210. In FIG. 2, for example, hard disk drive 241 is illustrated as storing operating system 244, application programs 245, other program modules 246, and program data 247. Note that these components can either be the same as or different from operating system 234, application programs 235, other program modules 236, and program data 237. Operating system 244, application programs 245, other program modules 246, and program data 247 are given different numbers here to illustrate that, at a minimum, they are different copies. A user may enter commands and information into the computer 210 through input devices, such as a keyboard 262 and pointing device 261, the latter of which is commonly referred to as a mouse, trackball, or touch pad. Other input devices (not shown) may include a microphone, joystick, game pad, satellite dish, scanner, or the like. These and other input devices are often connected to the processing unit 220 through a user input interface 260 that is coupled to the system bus, but may be connected by other interface and bus structures, such as a parallel port, game port, or universal serial bus (USB). A monitor 291 or other type of display device is also connected to the system bus 221 via an interface, such as a video interface 290. In addition to the monitor, computers may also include other peripheral output devices, such as speakers 297 and printer 296, which may be connected through an input/output peripheral interface 295.

The computer 210 may operate in a networked environment using logical connections to one or more remote computers, such as a remote computer 280. The remote computer 280 may be a personal computer, a server, a router, a network PC, a peer device, or other common network node, and typically includes many or all of the elements described above relative to the computer 210, although only a memory storage device 281 has been illustrated in FIG. 2. The logical connections depicted in FIG. 2 include a local area network (LAN) 271 and a wide area network (WAN) 273, but may also include other networks. Such network environments are commonplace in offices, enterprise-wide computer networks, intranets, and the Internet.

When used in a LAN networking environment, the computer 210 is connected to the LAN 271 through a network interface or adapter 270. When used in a WAN networking environment, the computer 210 typically includes a modem 272 or other means for establishing communications over the WAN 273, such as the Internet. The modem 272, which may be internal or external, may be connected to the system bus 221 via the input/output peripheral interface 295, or other appropriate mechanism. In a networked environment, program modules depicted relative to the computer 210, or portions thereof, may be stored in the remote memory storage device. By way of example, and not limitation, FIG. 2 illustrates remote application programs 285 as residing on memory device 281. It will be appreciated that the network connections shown are for illustrative purposes only and other means of establishing a communication link between the computers may be used.

A context menu in the form of a geometric figure bounded by two radii and an included arc of a circle ("a sector menu") is caused to appear to a user by various embodiments of the present invention so as to better aid the user in operating a personal computer. The sector menu can be invoked manually by the user (such as by right-clicking a pointing device) or automatically by various embodiments of the present invention as the user navigates a pointer. The sector menu includes multiple segments formed from multiple radii cutting the sector menu. Each menu item is housed by a segment of the sector menu and can be textually described or graphically represented. An operation represented by a menu item in a segment of the sector menu is selectable by passing a pointer over the segment. Each menu item can be statically defined or dynamically educed from the intentions of the user as he navigates the pointer. A system 300 in which sector menus are used is shown in FIG. 3A and an exemplary sector menu 334 appearing in the context of an application 308 is shown in FIG. 3B.

The system 300 is a computing environment that has pieces of hardware, software applications, and an operating system running on it. A user 302 operates a mouse 306 to navigate a pointer 336 in a graphical user interface operating on a personal computer 304. The personal computer 304 is a machine capable of repetitively and quickly performing calculations and instructions, and is designed to be used by a single person at a time. The personal computer 304 is smaller, less expensive, and easier to use than other classes of computers such as supercomputers, mainframe computers, and workstations. Personal computers, such as the personal computer 304, provide computational capabilities at a low cost to people who lack extensive programming experience. The user 302 operates the personal computer 304 to interface with worldwide communication networks, such as the Internet and the graphics-based information database known as the World Wide Web, to find information on virtually any subject.

Among applications running on the personal computer 304 is the application 308. The application 308, like other window applications, includes a title bar 310, which is a horizontal space at the top of a window that contains the name of the window (not shown). Most title bars, such as the title bar 310, also contain boxes of buttons for closing and resizing the window, such as buttons 310–322. Clicking on the title bar 310 allows the user 302 to move the entire window comprising the application 308. The button 318 is a minimize button, which is located in the upper right-hand corner of the application 308. When clicked, the minimize button hides the application 308. Appearing adjacent to the minimize button 318 is a maximize button 320. The maximize button 320 causes a window, such as the application 308, to expand and fill all of the space available within a larger window. Adjacent to the maximize button 320 is a close button 322, which is a square button with an X mark on it. Clicking on the close button 322 closes the application 308.

Subjacent to the title bar 310 is a menu bar 324, which is a rectangular bar displayed in the application 308 from which menus 311–314 can be selected by the user 302. Names of available menus are displayed in the menu bar 324, such as "FILE", "EDIT", and "HELP" Choosing one menu with the keyboard or with the mouse 306 causes the list of options in that menu to be displayed. A help button 326 can also be selected by the user 302 to cause a help pop-up menu (not shown) to be displayed without clicking the help menu 314. The help button 326 is represented by an on-screen symbol, resembling a dialog bubble adjacent to a question mark. Below the menu bar 324 is a work area 328 of the application 308 where the application 308 can contain or present its own document or pieces of content, such as a piece of content 330. The piece of content 330 is a bit-mapped graphic resembling the sun behind a cloud.

Suppose that the user 302 were to move a pointer 336 along a trajectory course 332 originating from a location of the pointer 336 and ending at a target 316, which is the EDIT menu 312. Various embodiments of the present invention present the sector menu 334, which includes segments 334A–334D, each segment corresponding to a menu item, which in turn corresponds to an operation, to aid the user 302 in his operation of the application 308. In the direction toward which the pointer 336 is moving, no segment is shown so as to avoid blocking, obscuring, or otherwise hindering the user 302 as he navigates the pointer 336 toward the target 316. While the sector menu 334 is preferably presented automatically to the user 302, the sector menu 334 can be manually invoked, such as by pressing a combination of keys on a keyboard.

The sector menu 334 surrounds the pointer 336 and the pointer 336 is located in the center of the sector menu 334. Once it appears, the sector menu 334 tracks the movement of the pointer 336 and moves along with the pointer 336. The sector menu 334 is shown with four segments 334A–334D although any suitable number of segments can be used. Segments 334A–334D contain textual descriptions "CUT", "COPY", "PASTE", and "UNDO", respectively identifying cut, copy, paste, and undo operations. The segment 334A houses a menu item which represents the cut operation allowing the user 302 to remove a portion of a piece of content, such as the piece of content 330. The segment 334B houses a menu item which represents the copy operation, which allows the user 302 to duplicate information and reproduce it in another part of a document of the application 308. The segment 334C houses a menu item which represents the paste operation allowing the user 302 to insert text or a graphic, such as the piece of content 330, that has been cut or copied from one document into a different location in the same or a different document. The segment 334D houses a menu item which represents the undo operation for reversing the last action of the user 302. For example, to undo a deletion, the undo operation in the menu item in the segment 334D is selected, thus restoring deleted text or a piece of content, such as the piece of content 330, to a document. Many application programs, such as the application 308, enable the user 302 both to undo and to redo an action. Any suitable operations or user interface controls can be invoked from the segments 334A–334D instead of cut, copy, paste, and undo operations.

In one embodiment of the present invention, the operations in segments 334A–334D are statically predefined by a programmer. In another embodiment of the present invention, operations being invoked from segments 334A–334D change depending on the operations most recently used by the user 302; the operations most frequently used by the user 302; the operations most relevant in the context of the application 308; or a combination of the described categories. In a further embodiment of the present invention, the operations of the menu items include a drop operation, which can drop a computing resource that was selected elsewhere in a computing environment. In yet another embodiment of the present invention, the operations of the menu items housed in segments 334A–334D are based on the intentions of the user 302 as educed by an empathetic human-machine interface (hereinafter "empathetic interface") that learns about the user 302 and can educe the intentions of the user 302 so as to aid the user 302 to better operate the personal computer 304. The description of such an empathetic interface (not shown) is discussed in U.S. patent application Ser. No. 10/456,365, filed Jun. 6, 2003, titled "Empathetic Human-Machine Interfaces," which is incorporated herein by reference.

Using the empathetic interface, intentions of the user 302 can be educed. Operations of user interface elements that are likely to be selected by the user 302 are placed as menu items housed by segments 334A–334D of the sector menu 334. As the user 302 navigates the pointer 336 in the application 308, the operations in the menu items housed by the segments of the sector menu 334 can change depending on the direction toward which the user 302 navigates the pointer 336. FIG. 3C illustrates the presentation of the sector menu 334 captured at two different times (but which are shown contemporaneously so as to better illustrate the changes in the operations of the menu items housed by the segments 334A–334D of the sector menu 334). A number of elements illustrated in FIG. 3C are similar to elements illustrated in FIG. 3B; for brevity their description will not be repeated.

During the first time snapshot, the user 302 navigates a pointer 336-1 along a first portion of a trajectory course 331 toward a target 316A. The empathetic interface programmatically determines that the direction toward which the pointer 336-1 is moving includes a set of user interface elements of interest (which include the minimize button 318, the maximize button 320, the close button 322, and the help button) all within the target 316A. The empathetic interface calculates a score for each button 318–326 reflecting the probability that the user 302 (or alternatively, a population of users) may select a corresponding button 318–326. If a button 318–326 has a high enough score, its operation becomes an operation in a menu item housed by a segment 334A-1–334D-1. Thus, without having to actually visit the target 316A, the user 302 can invoke a desired operation by selecting a menu item in a segment 334A-1–334D-1 of the sector menu 334-1.

The segment 334A-1 houses a menu item with an on-screen symbol resembling that of the minimize button 318 which upon activation invokes the operation of the minimize button 318. The segment 334B-1 houses a menu item with an on-screen symbol resembling that of the maximize button 320 which upon activation invokes the operation of the maximize button 320. The segment 334C-1 houses a menu item with an on-screen symbol resembling the close button 322 which upon activation invokes the operation of the close button 322. The segment 334D-1 houses a menu item with an on-screen symbol resembling the help button 326 which upon activation invokes the operation of the help button 326. Thus, the sector menu 334-1 educes an intention of the user 302 to visit the target 316A in which the operations of buttons 318–326 are shown as selectable menu items housed by the segments 334A-1–334D-1 of the sector menu 334-1.

Suppose that instead of completing the navigation of the pointer 336-1 to end at the target 316A, the user 302 navigates the pointer 336-1 away from the target 316A and toward another target 316B, which is the EDIT menu 312. The pointer 336-2 represents a second time snapshot in which the user 302 has navigated to the location at which the pointer 336-2 is positioned from the location at which the pointer 336-1 was positioned. The operations of the menu items of the sector menu 334-2 have been transformed from the operations of the menu items of the sector menu 334-1.

As the user 302 moves the pointer 336-2 toward the target 316B and away from the target 316A, the empathetic interface educes that the user 302 desires to select the EDIT menu 312 and one of its menu items. The empathetic interface calculates a score for each menu item of the EDIT menu 312. For those menu items of the EDIT menu 312 with sufficiently high scores, those menu items are housed by segments 334A-2–334D-2 of the sector menu 334-2. (Alternatively, all menu items of the EDIT menu 312 can be housed by the sector menu 334-2 but the presentation of each segment housing a corresponding menu item differs depending on its calculated score. These presentations can differ in terms of size, color, transparency, and so on.) The cut operation is represented by a menu item housed by segment 334A-2; the copy operation is represented by a menu item housed by the segment 334B-2; the paste operation is represented by a menu item housed by the segment 334C-2; and the undo operation is represented by a menu item housed by the segment 334D-2. These operations are ready for the user 302 to select without having to actually visit the EDIT menu 312. FIG. 3D illustrates how a menu item of the sector menu is selected.

Another sector menu 334-3 is illustrated in FIG. 3D. Whereas the sector menu 334-1 represents menu items only as on-screen symbols and the sector menu 334-2 represents menu items only as textual descriptions, the sector 334-3 represents menu items as containing a combination of on-screen symbols and textual descriptions. Segment 334A-3 houses a menu item with an on-screen symbol resembling a pair of scissors, for indicating the cut operation. Segment 334B-3 houses a menu item with an on-screen symbol resembling a set of document copies, indicating the copy operation. Segment 334C-3 houses a menu item with an on-screen symbol resembling a clipboard, indicating the paste operation. Segment 334D-3 houses a menu item with the text "UNDO," indicating the undo operation.

Suppose that the pointer 336-3 were to be navigated by the user 302 along a trajectory course 332-1. To select the cut operation represented by the menu item housed by the segment 334A-3, the user 302 would deliberately and abruptly depart from the direction of the trajectory course 332-1, detour in a new trajectory course 332-2, and pass over the segment 334A-3. By dragging the pointer 336-3 over the segment 334A-3, the cut operation is activated. Menu items contained in other segments 334B-3–334D-3 are similarly selected.

Many other suitable techniques are possible for selecting operations represented by menu items. For example, one suitable technique includes using a keyboard cue to mark a letter of a textual description of a menu item (e.g., "UNDO") so that when a user presses a key (e.g., "U") in combination with another key (e.g., the CTRL key), an operation associated with the menu item (e.g., an undo operation) is selected. Another suitable technique includes programmatically associating each segment of a sector menu with a number so that when the number is selected (e.g., the key "1" is pressed together with the CTRL key) the operation associated with the menu item housed by a segment is selected. A further suitable technique includes associating buttons on a mouse with corresponding segments so that when a button of the mouse is actuated, the operation associated with the menu item housed by the menu item is selected.

The sector menu 334-3 disappears when it is no longer useful to the user 302. Any suitable techniques to cause the sector menu 334-3 to disappear at an appropriate time can be used. One suitable technique includes removing the sector menu 334-3 at the conclusion of selecting an operation represented by a menu item. Another suitable technique includes removing the sector menu 334-3 after a certain time period has expired after the presentation of the sector menu 334-3. A further suitable technique includes an abrupt motion by the actuation of the mouse 306 whose purpose is not for selecting an operation represented by a menu item. Many other suitable techniques are possible.

Figure 3E:
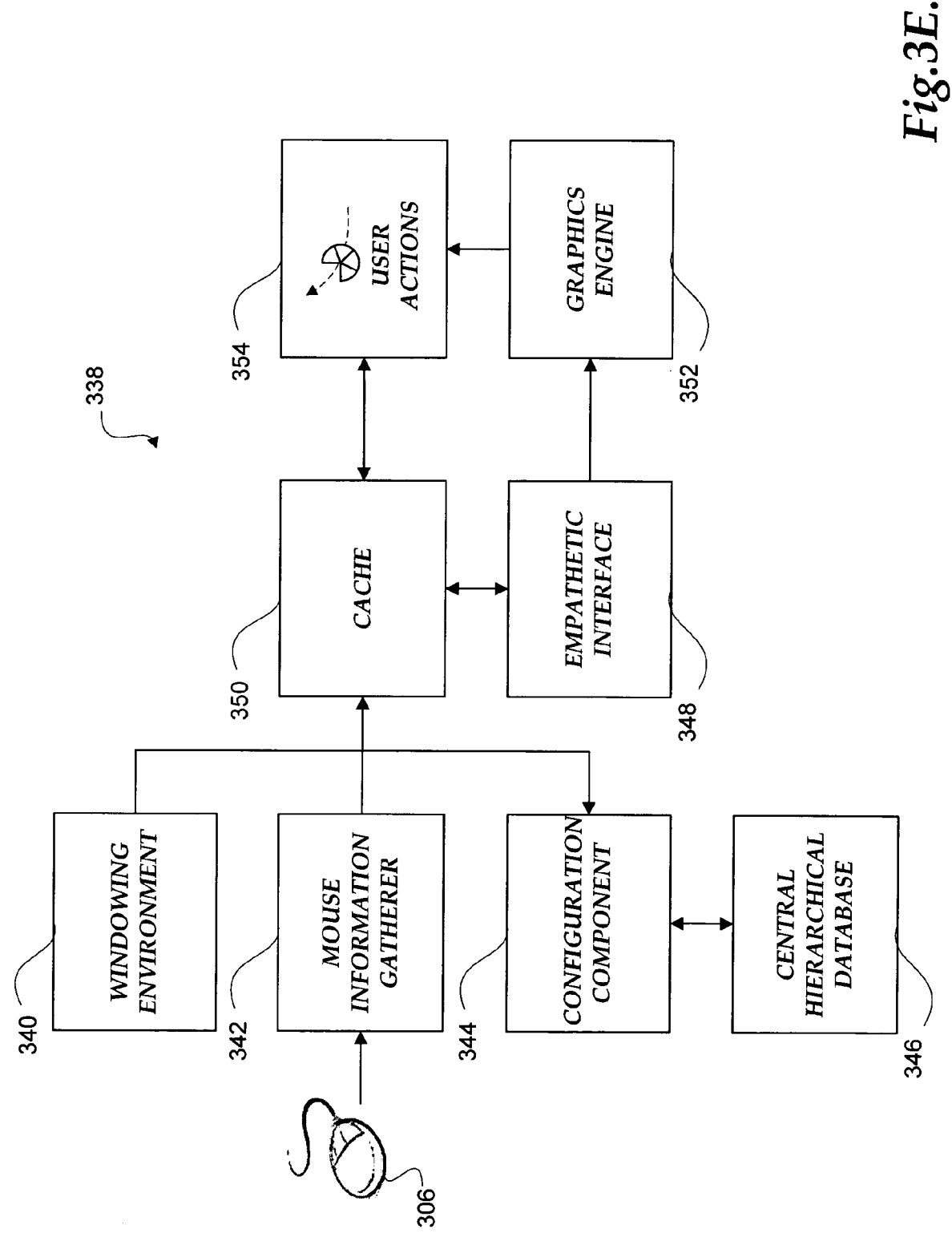
FIG. 3E is block diagram illustrating pieces of a system for educing user intentions through nuance motions of a pointing device, such as a mouse, and for presenting a sector menu while navigating a pointer in a user interface, according to one embodiment of the present invention.
Figure 4A:
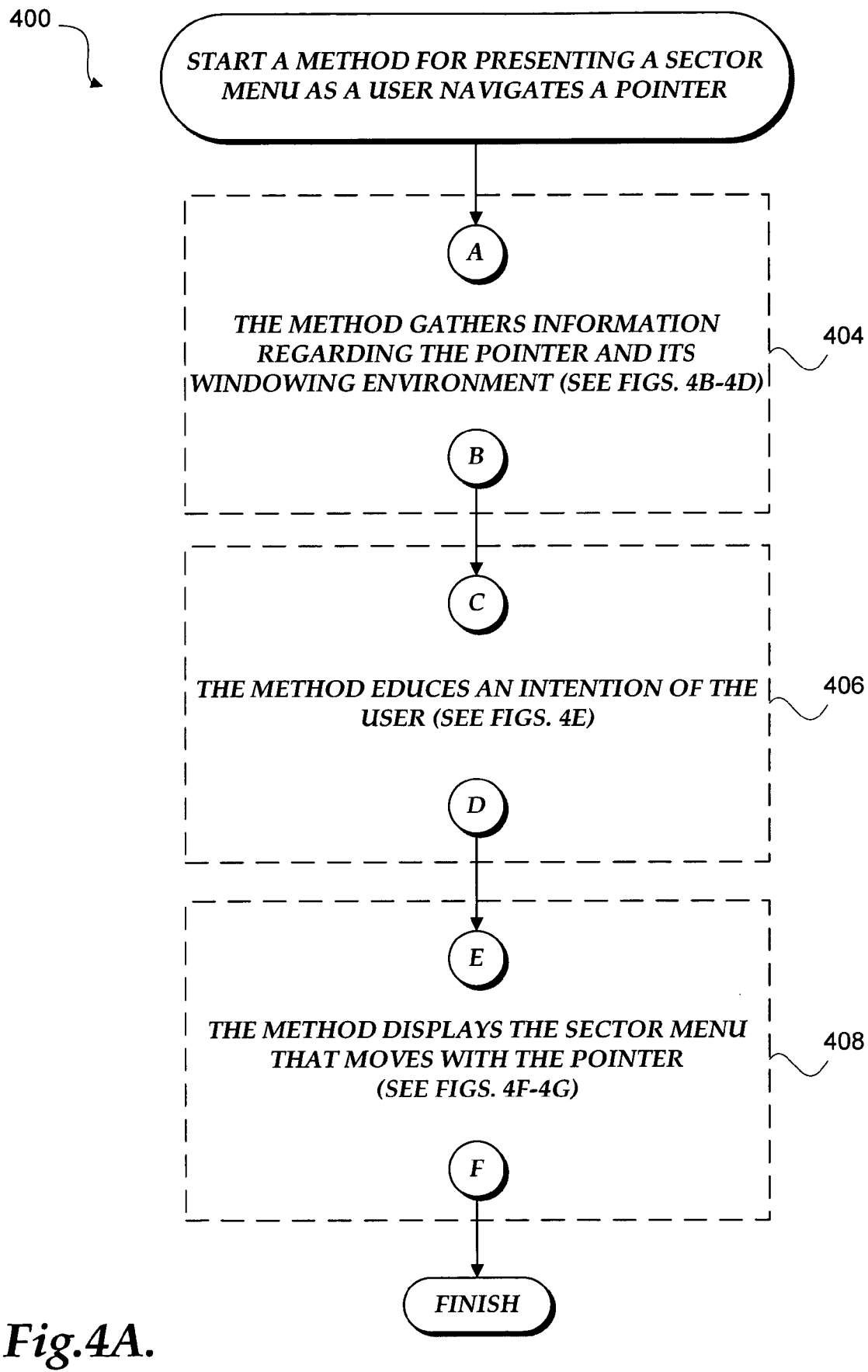
FIGS. 4A–4G are process diagrams illustrating a method for presenting a sector menu as a user navigates a pointer, according to one embodiment of the present invention.
Figure 4B:
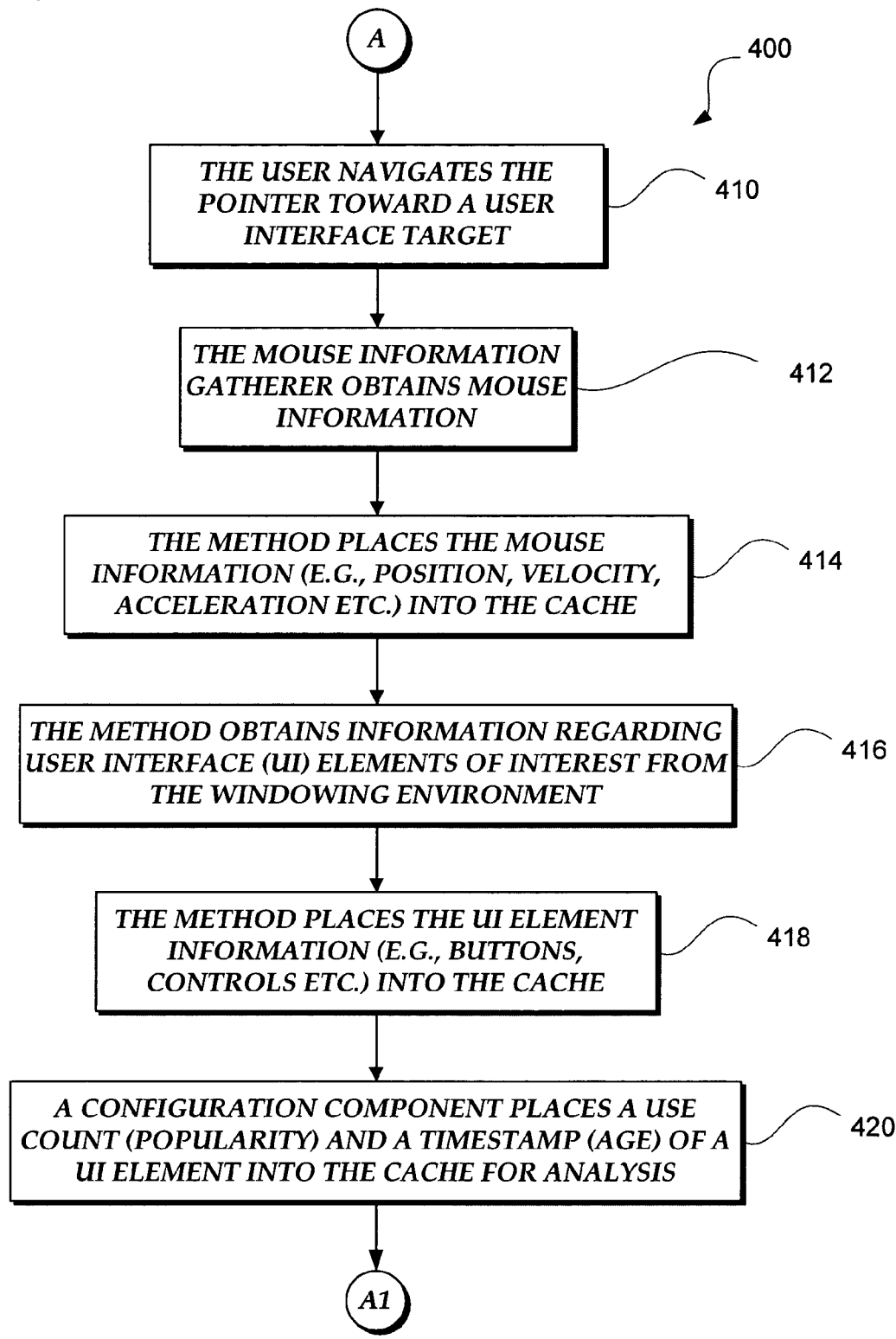
Figure 4C:
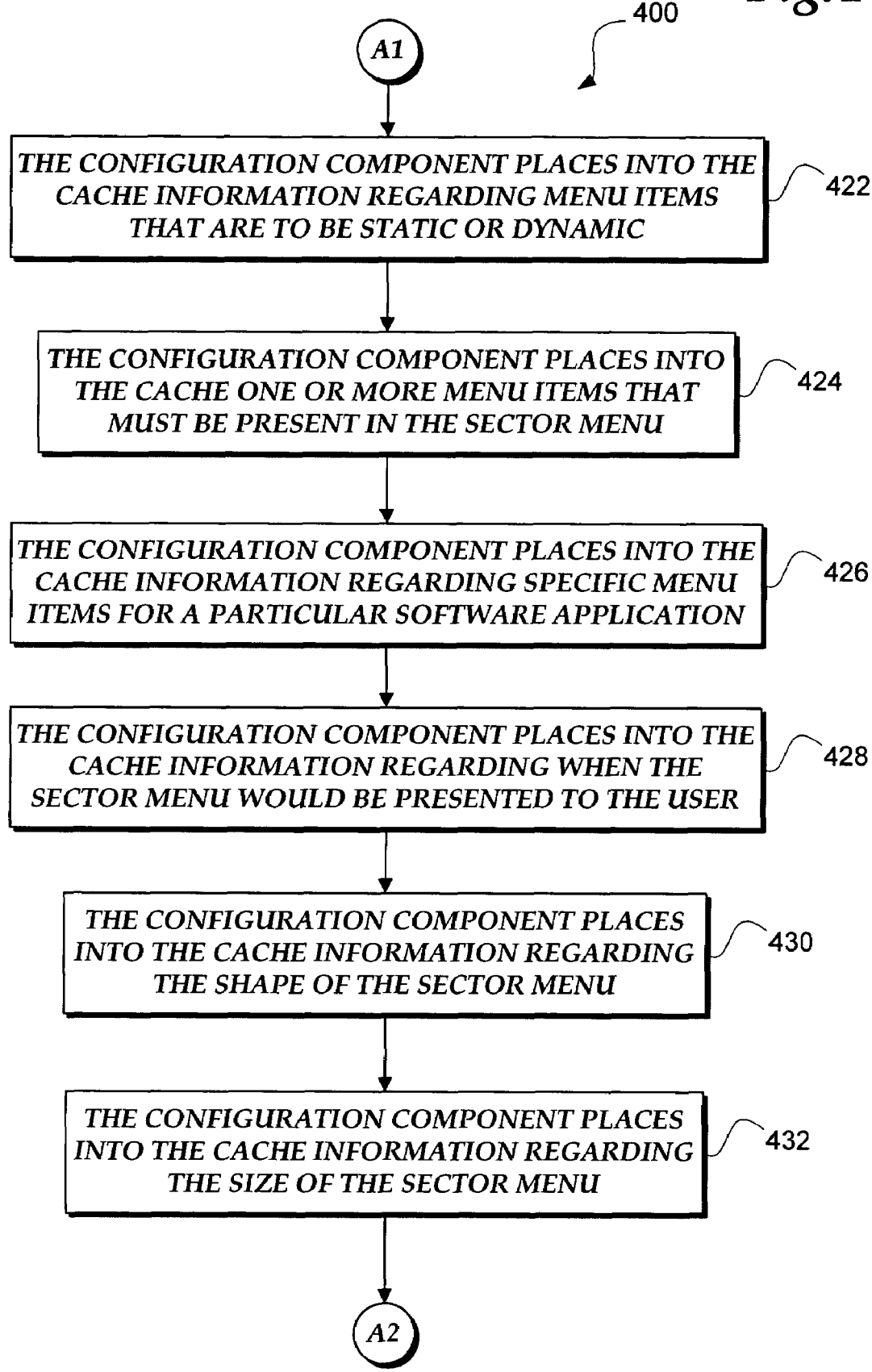
Figure 4D:
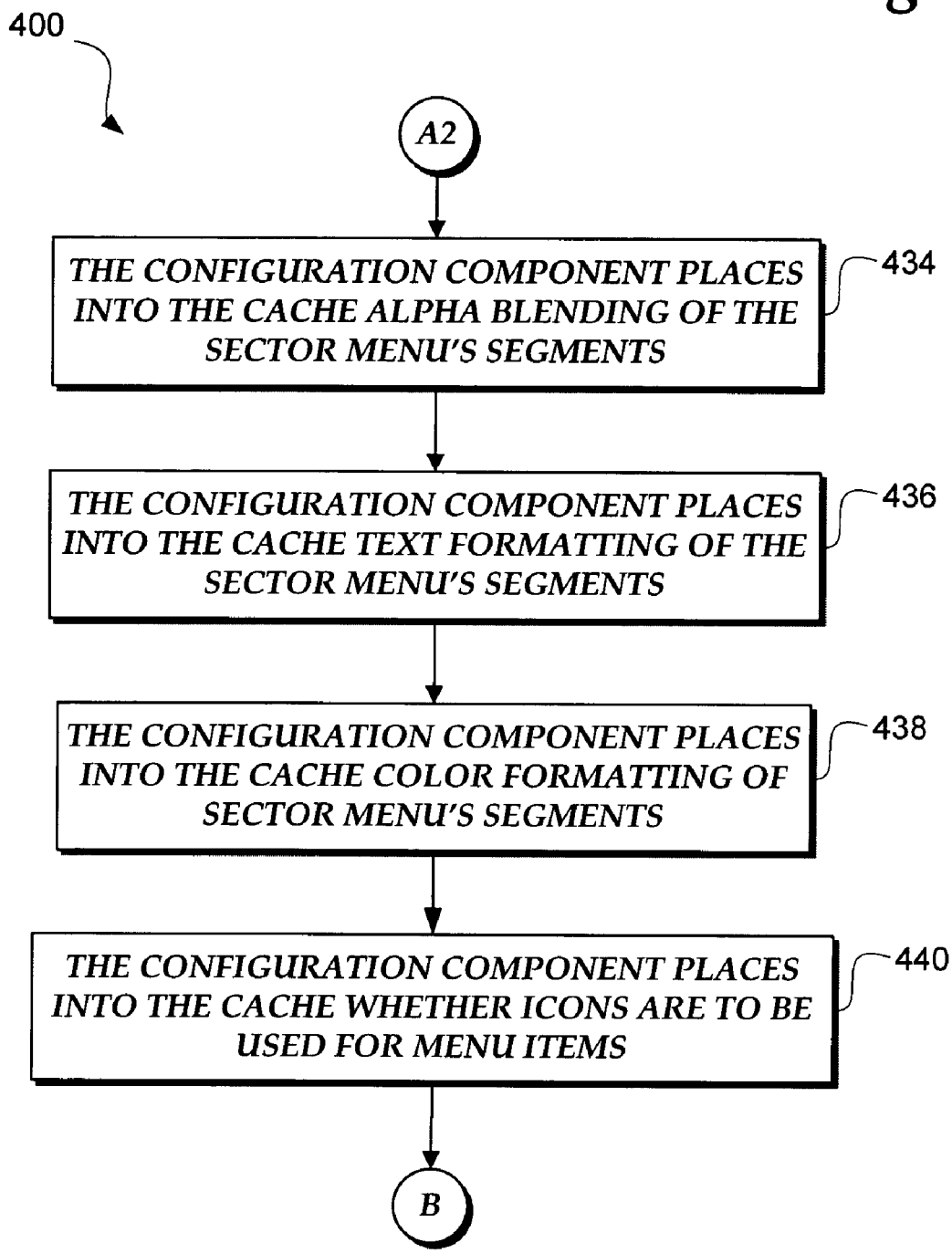
Figure 4E:
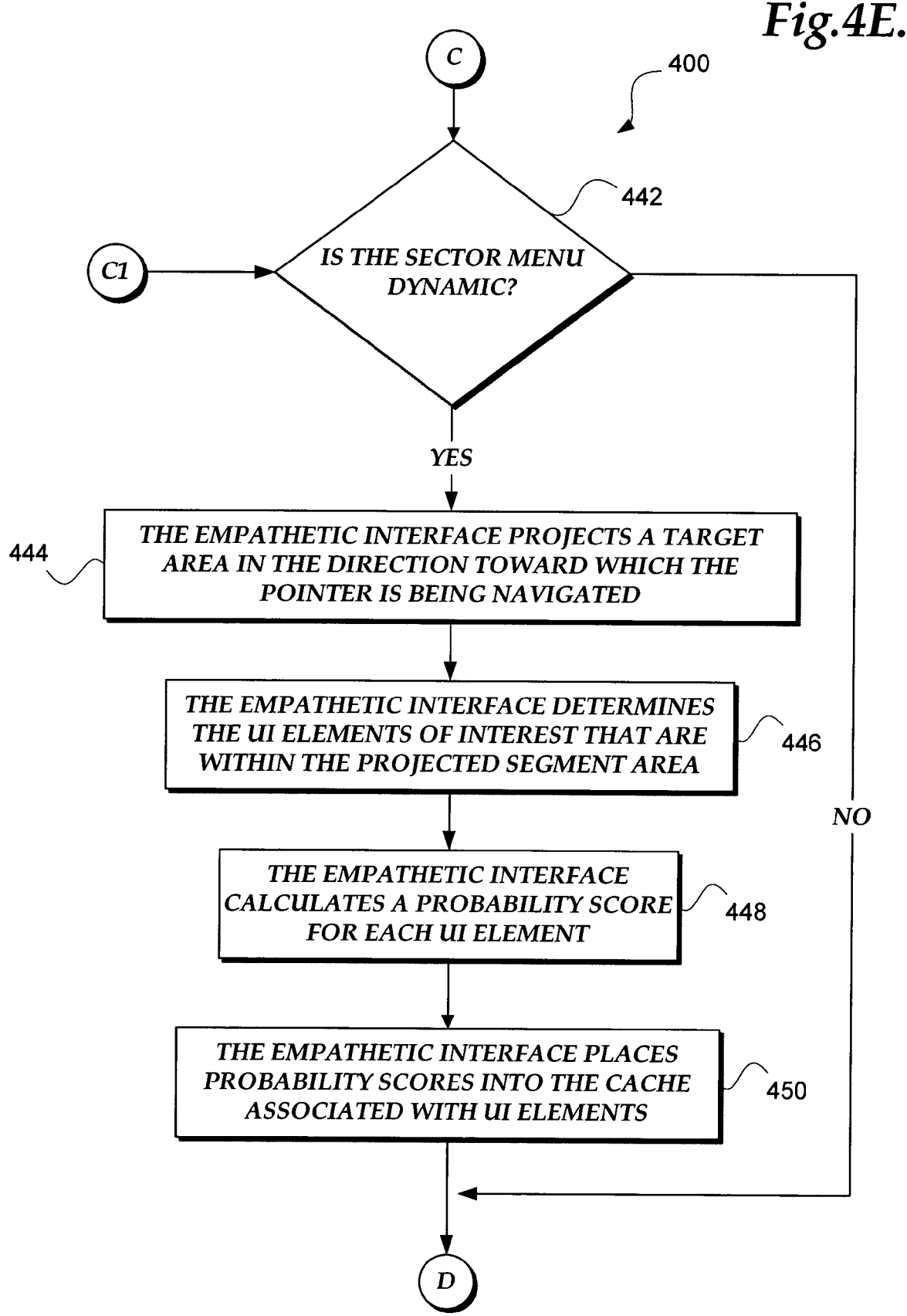
Figure 4F:
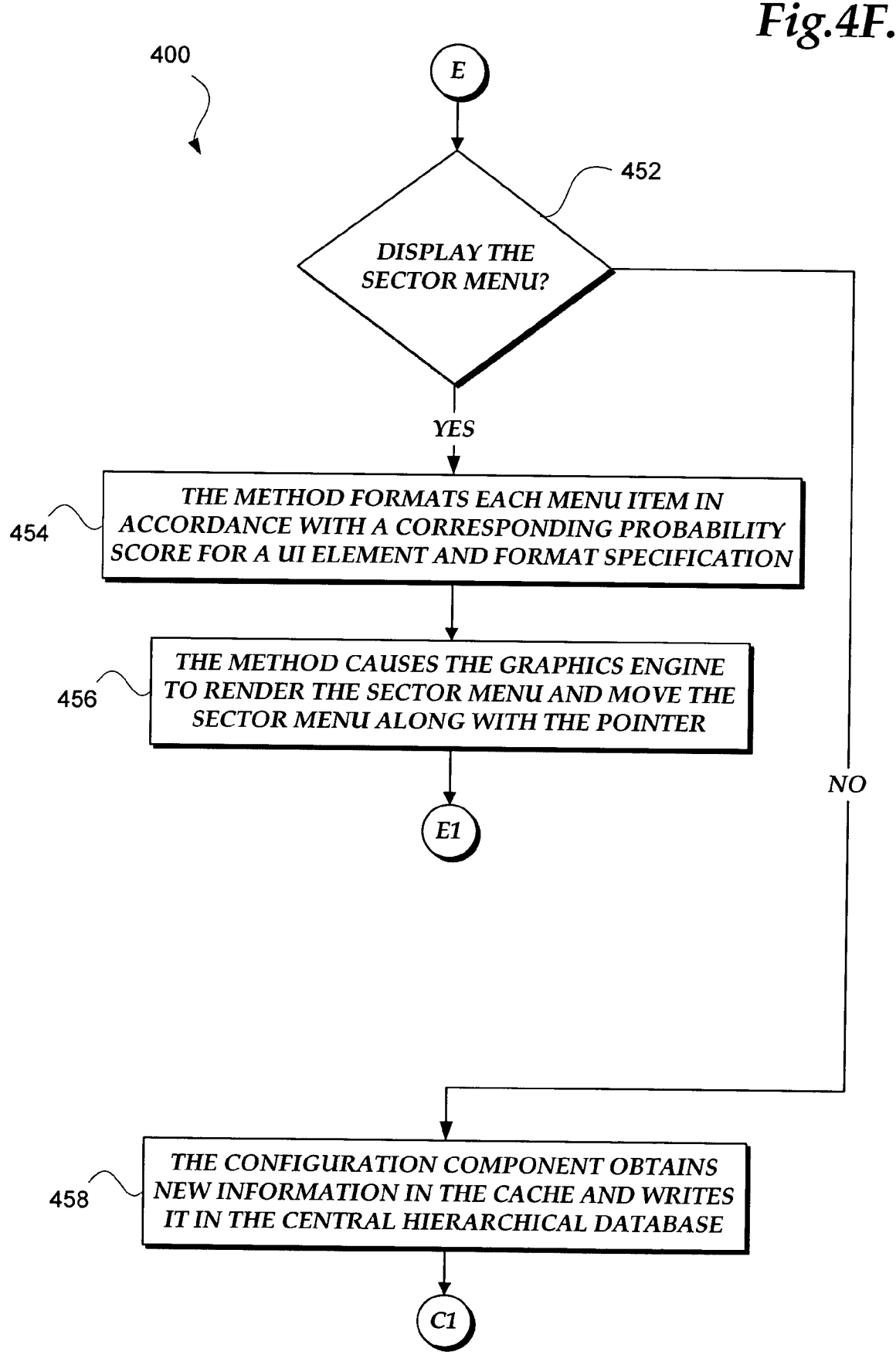
Figure 4G:
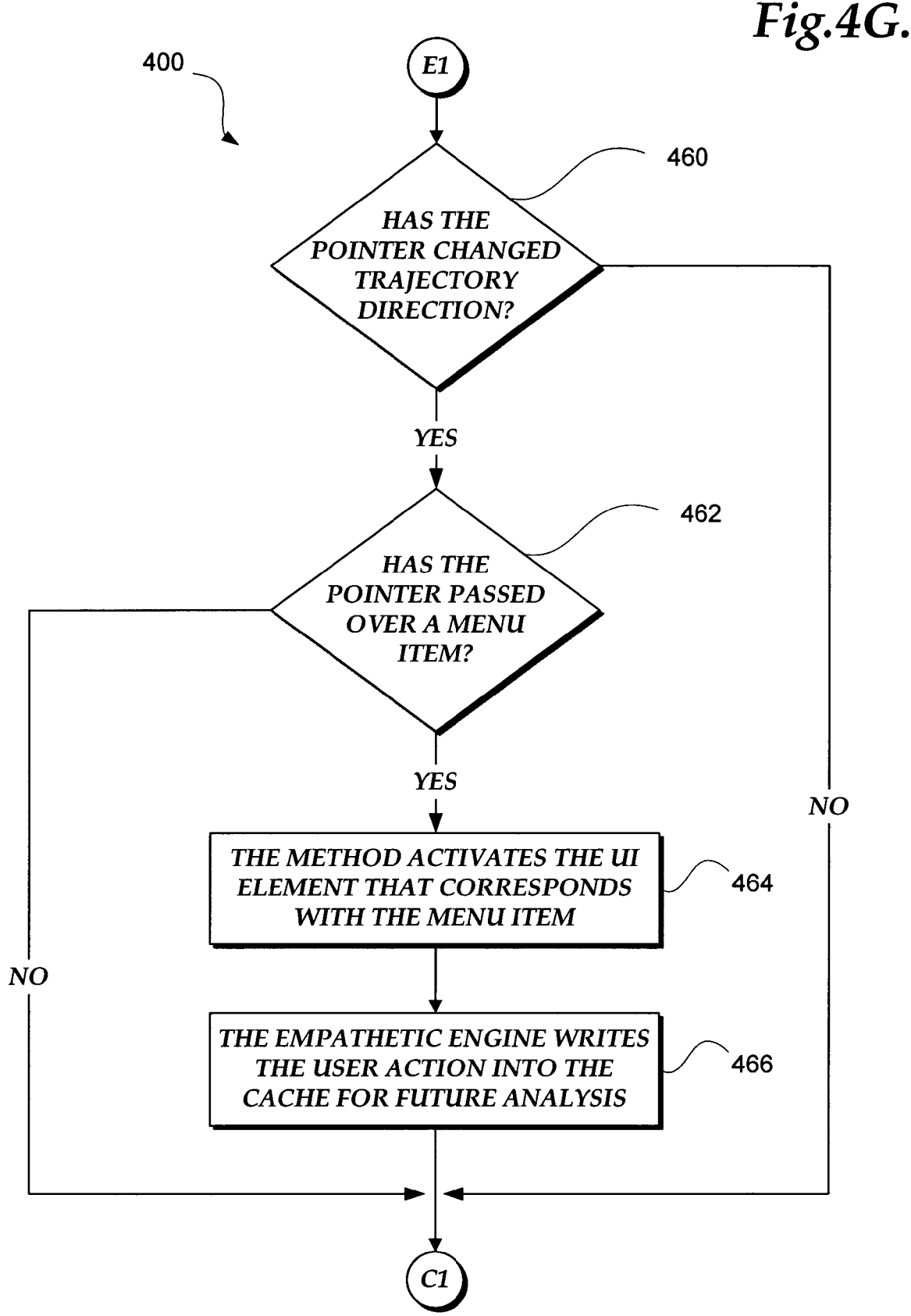

FIG. 3E illustrates a system 338 for presenting sector menus. The system 338 is a group of components for presenting sector menus, such as the sector menu 334-3. The system 338 includes a windowing environment 340. The windowing environment 340 contains information and provides information about windows and user interface elements in windows. The locations at which these user interface elements and windows are positioned are also provided by the windowing environment 340. One exemplary implementation of the windowing environment in which these pieces of information can be obtained is a tree. This tree is a data structure which contains one or more nodes that are linked together in a hierarchical fashion. One node is the root and represents the main window of a graphical user interface; each node except the root is the child of one and typically only one other node, which is also a window; and each node has zero or more nodes as children, each being a window also. By traversing this tree, all user interface elements, such as menus, buttons, toolbars, and list boxes, among others, and the location at which they are positioned on a computer screen, can be obtained. A portion of the tree is placed in a cache 350.

Motions of the mouse 306 are detected by a mouse information gatherer 342. The mouse information gatherer 342 is described in the incorporated reference and for brevity will not be further discussed. The mouse information gatherer 342 provides certain pieces of information to the cache 350, such as position, velocity, and acceleration, among others.

The cache 350 programmatically contains not only user interface elements, such as menus, buttons, toolbars, and list boxes, but the navigation information of the pointer 336-3. Various pieces of information can be educed from the cache 350, such as user interface elements that the user 302 would likely encounter should the user 302 continue on a particular trajectory course, such as the trajectory course 332-1.

The system 338 also includes a central hierarchical database 346 which is used to store information necessary to configure the operating system, applications, and hardware devices for the personal computer 304. The central hierarchical database contains information that an operating system would typically reference during operation of the sector menu 334-3. One exemplary implementation of the central hierarchical database is the registry of Microsoft WINDOWS® operating systems. Pieces of information stored in the central hierarchical database 346 relating to the sector menu 334-3 include the number of times the user 302 has used a particular user interface element. This number is stored in a count. Additionally, the central hierarchical database 346 stores a time stamp associated with the last time the user 302 has used a particular user interface element. Other pieces of information stored include how the sector menu 334-3 would be presented to the user 302; specific menu items that are to be displayed with the sector menu 334-3; whether the menu items in the segments of the sector menu 334-3 are static or dynamic, whether the menu items shown in the segments of the sector menu 334-3 are application-dependent (e.g., a word processing application may have operations represented by the menu items of the sector menu 334-3 that are different from those for a spreadsheet application); the situation when the sector menu 334-3 would be presented to the user 302; the size of the sector menu 334-3 when it is presented; the shape of the sector menu 334-3; and whether a particular user interface element must always be displayed with the presentation of the sector menu 334-3.

The configuration component 344 takes these pieces of information from the central hierarchical database 346 and places them into the cache 350 for analysis by the empathetic interface 348. The empathetic interface 348 is as described in the incorporated reference and for brevity its description will not be repeated here. Using the information in the cache 350, the empathetic interface 348 projects a target area in the direction toward which the pointer 336-3 is being navigated by the user 302. User interface elements that are captured within the projected target area will be analyzed and given a score by the empathetic interface 348. Those user interface elements that have a high enough score are displayed as menu items in the segments of the sector menu 334-3.

The presentation of each menu item varies from another depending on its corresponding score. Those user interface elements that are more likely to be selected by the user 302 will be presented in a more conspicuous manner by the system 338 than other menu items. For example, the area of the segment containing the menu item with a high score may be larger than other segments. Or the color used to present the highly scored menu item in a segment can be brighter or bolder than other segments. Using alpha blending, those menu items that have higher scores can be made to appear more opaque than transparent. Many other suitable presentation techniques are also possible.

A graphics engine 352 is commanded by the empathetic engine 348 to render the sector menu 334-3 along with the segments housing menu items. The graphic engine 352 has direct access to the personal computer's graphics hardware to render the sector menu 334-3 on the personal computer 304. Once the sector menu 334-3 has been displayed, the user 302 may use the mouse 306 to move the pointer 336-3 to select a menu item, such as the cut operation in the segment 334A-3. Such user actions are recorded by the user actions component 354 and are stored in the cache 350. Periodically (preferably every 10 to 30 minutes), the configuration component 344 copies a portion of the cache 350 and stores such a portion in the central hierarchical database 346 so as to aid the empathetic interface 348 in future analysis.

FIGS. 4A–4G illustrate a method 400 for presenting a sector menu as a user navigates a pointer in a user interface. For clarity purposes, the following description of the method 400 makes references to various elements illustrated in connection with the system 300 (FIGS. 3A–3D) and the system 338 (FIG. 3E). From a start block, the method 400 proceeds to a set of method steps 404, defined between a continuation terminal ("terminal A") and an exit terminal "terminal B"). The set of method steps 404 describes the process of gathering information regarding the pointer, such as the pointer 336-3 and its windowing environment.

From terminal A (FIG. 4B), the method 400 proceeds to block 410 where the user 302 navigates the pointer 336-3 toward a user interface target, such as the target 316A. The mouse information gatherer 342 obtains mouse information from the mouse 306 as the user 302 navigates the pointer 336-3. See block 412. Next, the method 400 places the mouse information (e.g., position, velocity, acceleration, etc.) into the cache 350. See block 414. At block 416, the method 400 obtains information regarding user interface elements of interest from the windowing environment 340. As discussed above, one exemplary implementation of the windowing environment includes a tree data structure. The tree data structure can then be traversed and user interface elements of interest can be obtained therefrom. The method 400 places the user interface element information (e.g., buttons, controls, etc.) into the cache 350 after obtaining the information from the tree data structure. See block 418. The configuration component 344 places a use count (popularity) and a time stamp (age) of a user interface element into the cache for later analysis by the empathetic interface 348. See block 420. From here, the method 400 proceeds to another continuation terminal ("terminal A1").

From terminal A1 (FIG. 4C), the configuration component 344 places into the cache 350 information regarding menu items that are to be static or dynamic. See block 422. Static menu items do not change with changes in the movement of the pointer 336-3, whereas dynamic menu items change depending on the direction toward which the pointer 336-3 is going. At block 424, the configuration component 344 places into the cache one or more menu items that must be present in the sector menu 334-3. The configuration component 344 then places into the cache 350 information regarding specific menu items for a particular software application. See block 426. For example, suppose a word processing application always requires a file menu item to be present in the sector menu 334-3. The processing step at block 426 would impose a requirement that whenever the sector menu 334-3 is presented to the user 302, the file menu item be present.

The method 400 then proceeds to block 428 where the configuration component 344 places into the cache 350 information regarding when the sector menu 334-3 would be presented to the user 302. The configuration component 344, at block 430, places into the cache 350 information regarding the shape of the sector menu 334-3. While the geometric shape of the sector menu has been shown to be circular, other suitable geometric shapes can be used, such as a rectangle, triangle, or ellipsoid. The configuration component 344 then places into the cache 350 information regarding the size of the sector menu 334-3. See block 432. The method 400 then proceeds to another continuation terminal "terminal A2").

From terminal A2 (FIG. 4D), the method 400 proceeds to block 434 where the configuration component 344 places into the cache 350 alpha blending information. Alpha blending is a technology allowing two graphic images to be merged, each graphic comprising a percentage of a sum that equals to 100 percent. Alpha blending technology creates opaqueness or transparentness of a merged graphic, such as a segment of the sector menu 334-3. The method 400 then proceeds to block 436 where the configuration component 344 places into the cache 350 text formatting of the sector menu's 334-3 segments. Textual information can be italicized, made bold, or underlined, among other text formats. At block 438, the configuration component 344 places into the cache 350 color formatting of sector menu's 334-3 segments. The configuration component 344 places in the cache 350 whether icons are to be used for menu items. See block 440. The method 400 then enters exit terminal B.

From terminal B (FIG. 4A), the method 400 proceeds to a set of method steps 406, defined between a continuation terminal ("terminal C") and an exit terminal ("terminal D"). The set of method steps 406 describes educing an intention of the user 302 in navigating the pointer 336-3 for the presentation of the sector menu 334-3. From terminal C (FIG. 4E), the method 400 proceeds to decision block 442 where a test is made to check whether the sector menu 334-3 is dynamic. If the answer to the test at decision block 442 is NO, the method 400 proceeds to exit terminal D. Otherwise, if the answer to the test at decision block 442 is YES, the empathetic interface 348 projects a target area in the direction toward which the pointer 336-3 is being navigated by the user 302. See block 444. At block 446, the empathetic interface 348 determines the user interface elements of interest that are within the projected target area. The empathetic interface 348 then calculates a score for each user interface element of interest. See block 448. The empathetic interface 348 then places the scores into the cache 350 associated with user interface elements of interest. See block 450. From here, the method 400 proceeds to exit terminal D.

From terminal D (FIG. 4A), the method 400 proceeds to a set of method steps 408, defined between a continuation terminal ("terminal E") and an exit terminal ("terminal F"). The set of method steps 408 describes the process of displaying the sector menu 334-3 that moves with the pointer 336-3. From terminal E (FIG. 4F), the method 400 proceeds to decision block 452 where a test is made to check whether to display the sector menu 334-3. If the answer to the test is YES, the method 400 formats each menu item in accordance with a corresponding probability score for a user interface element and format specification as indicated in the cache 350. See block 454. The method 400 then causes the graphics engine 352 to render the sector menu 334-3 and move the sector menu 334-3 along with the pointer 336-3. See block 456. The method 400 then enters another continuation terminal ("terminal E1").

If the answer to the test at decision block 452 is NO, the configuration component 344 obtains new information in the cache 350 and writes it in the central hierarchical database 346. See block 458. Preferably, the configuration component 344 checks the cache 350 every 10–30 minutes and writes new information in the central hierarchical database 346. Information such as the number of times the user selects a particular user interface element is useful for future analysis of the empathetic interface 348. The method 400 then enters another continuation terminal ("terminal C1") to loop back to decision block 442 where the above-described processing steps are repeated.

From terminal E1 (FIG. 4G), the method 400 proceeds to decision block 460 where a test is made to determine whether the pointer 336-3 has changed trajectory direction. If the answer is NO, the method 400 proceeds to terminal C1 to loop back to decision block 442 where the above-described processing steps are repeated. Otherwise, the answer to the test at decision block 460 is YES, and the method 400 proceeds to another decision block 462 where another test is made to determine whether the pointer 336-3 has passed over a menu item. If the answer to the test at decision block 462 is NO, the method 400 proceeds to terminal C1 and repeats the above-described processing steps from decision block 442.

If the answer is YES to the test at decision block 462, the method 400 activates the user interface element that corresponds with the menu item that the pointer 336-3 has passed. See block 464. For example, if the pointer 336-3 passes over segment 334A-3 containing a menu item pertaining to the cut operation, the cut operation will be invoked. The empathetic engine 348 then writes the user action into the cache 350, which can be eventually stored in the central hierarchical database 346, for future analysis. See block 466. From here, the method 400 enters the terminal C1 to loop back to decision block 442 where the above-described processing steps are repeated.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A method implemented in a computer system for presenting context-sensitive menus as a user navigates a pointer, comprising: gathering data regarding a windowing environment in which the pointer navigates; educing user interface elements at a target to which the pointer navigates; and displaying a sector menu that moves with the pointer, the act of displaying including displaying multiple segments formed by multiple radii cutting the sector menu, a segment housing a menu item which includes a user interface element at the target toward which the pointer navigates wherein the sector menu lacks a segment, defining a devoid segment, and wherein the devoid segment is oriented in the direction toward which the pointer is moving except when the pointer is moving over one of the multiple segments to select said one of the multiple segments.

2. The method of claim 1, wherein displaying includes displaying predefined menu items that must be present in displaying the sector menu.

3. The method of claim 1, wherein educing includes assigning a score to each user interface element in the target, the score indicating the likelihood a user would select the user interface element.

4. The method of claim 3, wherein displaying includes displaying a menu item with a high score different from displaying a menu item with a low score.

5. The method of claim 1, further comprising receiving a selection of a menu item when the pointer passes over the selected menu item.

6. A computer storage medium having computer-executable instructions that implements a method for providing context-sensitive menus, the method comprising: gathering data regarding a windowing environment in which the pointer navigates; educing user interface elements at a target to which the pointer navigates; and displaying a sector menu that moves with the pointer, the act of displaying including displaying multiple segments formed by multiple radii cutting the sector menu, a segment housing a menu item which includes a user interface element at the target toward which the pointer navigates wherein the sector menu lacks a segment, defining a devoid segment, and wherein the devoid segment is oriented in the direction toward which the pointer is moving except when the pointer is moving over one of the multiple segments to select said one of the multiple segments.

7. The method of claim 6, wherein displaying includes displaying predefined menu items that must be present in displaying the sector menu.

8. The method of claim 6, wherein educing includes assigning a score to each user interface element in the target, the score indicating the likelihood a user would select the user interface element.

9. The method of claim 8, wherein displaying includes displaying a menu item with a high score different from displaying a menu item with a low score.

10. The method of claim 6, further comprising receiving a selection of a menu item when the pointer passes over the selected menu item.

* * * * *